United States Patent
Vankipuram et al.

(10) Patent No.: US 11,586,347 B2
(45) Date of Patent: Feb. 21, 2023

(54) PALM-BASED GRAPHICS CHANGE

(71) Applicant: Hewlett-Packard Development Company, L.P., Spring, TX (US)

(72) Inventors: Mithra Vankipuram, Palo Alto, CA (US); Ian N. Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/424,736

(22) PCT Filed: Apr. 22, 2019

(86) PCT No.: PCT/US2019/028492
§ 371 (c)(1),
(2) Date: Jul. 21, 2021

(87) PCT Pub. No.: WO2020/219008
PCT Pub. Date: Oct. 29, 2020

(65) Prior Publication Data
US 2022/0075493 A1 Mar. 10, 2022

(51) Int. Cl.
*G06F 3/048* (2013.01)
*G06F 3/0488* (2022.01)

(52) U.S. Cl.
CPC .................. *G06F 3/0488* (2013.01)

(58) Field of Classification Search
CPC ............ G06F 3/017; G06F 3/0488; G06F 2203/04808
See application file for complete search history.

(56) References Cited

U.S. PATENT DOCUMENTS

| 10,088,943 | B2 | 10/2018 | Chen et al. | |
|---|---|---|---|---|
| 2006/0238519 | A1 | 10/2006 | Westerman et al. | |
| 2007/0177804 | A1* | 8/2007 | Elias | G06V 40/28 382/188 |
| 2008/0174570 | A1* | 7/2008 | Jobs | H04M 1/72436 345/173 |
| 2009/0027330 | A1 | 1/2009 | Aida | |
| 2012/0287053 | A1* | 11/2012 | Bos | G06F 3/03547 345/173 |
| 2015/0268722 | A1* | 9/2015 | Wang | A63F 13/843 345/156 |
| 2017/0315615 | A1* | 11/2017 | Cook | G06F 3/0304 |

FOREIGN PATENT DOCUMENTS

| CN | 1828499 A | 9/2006 |
|---|---|---|
| JP | 2015122124 A | 7/2015 |

OTHER PUBLICATIONS

Pranav Mistry and Pattie Maes, "Mouseless: A Computer Mouse as Small as Invisible," CHI 2011, May 7-12, 2011, Vancouver, BC, Canada.

* cited by examiner

*Primary Examiner* — Claudia Dragoescu
(74) *Attorney, Agent, or Firm* — Quarles & Brady LLP

(57) ABSTRACT

An apparatus comprises, a user interface surface, sensor circuitry, and logic circuitry. The sensor circuitry to detect a palm-based touch event caused by a user's hand relative to the user interface surface to indicate a degree of coarseness for a graphics change, and detect a digit-based touch event caused by a digit of the user's hand relative to the user interface surface. The logic circuitry to, in response to the touch events indicating the palm is in a fixed position and a position of the digit, provide data associated with the graphics change.

15 Claims, 5 Drawing Sheets

PALM-BASED GRAPHICS CHANGE

BACKGROUND

A computer mouse is a peripheral device used as an input for a variety of different computing devices, such as laptop computers and tablets. The computer mouse may provide control of a cursor action and/or cause other mouse-based actions. A user may add the computer mouse as such a peripheral device by connecting a wired mouse or a wireless mouse to the computing device. Use of the computer mouse may involve movement of the mouse relative to a surface such as a thin rubber or plastic cushion pad to provide traction and facilitate cursor movement of the computer mouse.

In certain instances, a computer mouse is replaced by a touch display screen that acts as an input device to control the display. Display touch screens are sensitive to touch events, including physical-pressure screen touches and near-touch proximity touches as most commonly implemented using capacitive-based sensing. Such touch events are caused by a user interacting with the computer display screen with a user's finger moving toward or touching pictures or words on the screen to effect control over the display.

BRIEF DESCRIPTION OF FIGURES

Various examples may be more completely understood in consideration of the following detailed description in connection with the accompanying drawings, in which.

Figure 1:
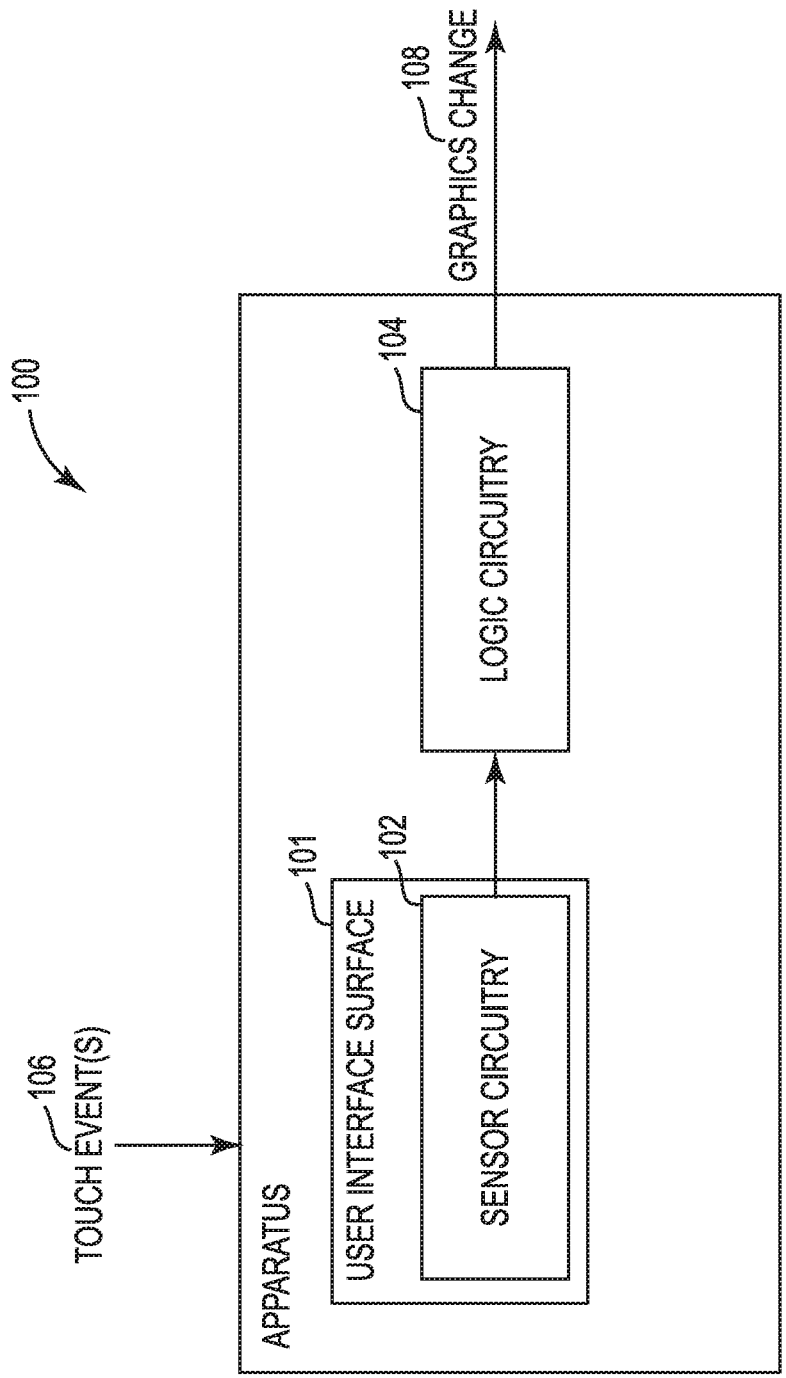
FIG. 1 illustrates an example apparatus for providing a palm-based graphics change, in accordance with the present disclosure.

While various examples discussed herein are amenable to modifications and alternative forms, aspects thereof have been shown by way of example in the drawings and will be described in detail. It should be understood, however, that the intention is not to limit the disclosure to the particular examples described. On the contrary, the intention is to cover all modifications, equivalents, and alternatives falling within the scope of the disclosure including aspects defined in the claims. In addition, the term "example" as used throughout this application is by way of illustration, and not limitation.

DETAILED DESCRIPTION

Aspects of the present disclosure are believed to be applicable to a variety of different types of apparatuses, systems and methods involving a palm-based graphics change provided using a user interface surface, and more particularly involving use of the user interface surface as a device to provide graphics changes for a processing circuit. In certain implementations, aspects of the present disclosure have been shown to be beneficial when used in the context of an apparatus having a user interface surface and sensor circuitry that sense a palm-based touch event and/or digit-based touch event caused by a user's hand relative to the user interface surface. In some examples, the touch events cause data, such as a control signal, to be sent to another computing device having a display screen to provide control over graphics displayed on the display screen, such as cursor control, scrolling and/or other inputs as may be provided by a computer mouse. While not necessarily so limited, various aspects may be appreciated through the following discussion of non-limiting examples.

In the following description various specific details are set forth to describe specific examples presented herein. However, other examples and/or variations of these examples may be practiced without all the specific details given below. In other instances, features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or example may be combined with features of another figure or example even though the combination is not explicitly shown or explicitly described as a combination.

In accordance with various examples, an apparatus having a user interface surface is used to provide graphics changes for a processing circuit with the user interface surface replacing a computer mouse. The user interface surface has sensor circuitry to detect touch events indicative of the user's hand touching the user interface surface, and to convert the touch events to data associated with graphics changes for replacing a computer mouse and without the use of a computer mouse. The apparatus includes logic circuitry to interpret the touch events, such as movements of the user's hand and changes in a contact pattern. The user interface surface and sensor circuitry may be embedded into various surfaces, such as the fabric of a laptop computer case, a cover or sleeve of a tablet pad or a keyboard and/or a surface of a desk, among other non-limiting examples, thereby converting the surface into an interactive touch surface providing touch events that function to replace the computer mouse. In a number of related examples, the apparatus provides haptic feedback to the user in response to the touch events, which may be used to train the user on how to use the apparatus.

In accordance with a particular example, the apparatus may include a user interface surface, sensor circuitry, and logic circuitry. The user interface surface may be a surface of a device, such as a touch pad, a touch screen, a sleeve or cover to be placed over a computing device or keyboard, a cover of a computing device or tablet, among other devices, such as a surface of furniture. The user may touch the user interface surface to provide data associated with a graphics change, which may include or be indicative of a degree of coarseness for the graphics change, to a computing device. The user interface surface may be associated with sensor circuitry to detect the touch events of the user's hand relative to the user interface surface. For example, the sensor circuitry detects a palm-based touch event caused by the user's hand relative to the user interface surface to indicate a degree of coarseness for a graphics change, and detects a digit-based touch event caused by a digit of the user's hand relative to the user interface circuit. The sensor circuitry may be communicatively coupled to the logic circuitry. The logic circuitry may, in response to the touch events indicating the palm is in a fixed position and a position of the digit, such as a position of a plurality of digits, provide data associated with the graphics change. The data may be indicative of or include the degree of coarseness which includes whether the graphics change is relatively gross or fine. In such examples and various other examples, the apparatus, in response to the touch events, operates to replace a computer mouse and to provide control over graphics on a display screen of a computing device, sometimes herein referred to as "computer-screen graphics".

A variety of graphics changes may be provided using a device in accordance with the instant disclosure. The palm-based touch event may be used to indicate the degree of coarseness for a graphics change including providing differentiation between gross and fine movement, or a plurality of degrees of relative coarseness of movement, in some examples. In a specific example, the degrees of coarseness may include two or more degrees, such as between three to nine different degrees. The degree of coarseness may be indicative of whether the graphics change is a relatively a gross or fine cursor movement, or other types of graphics changes, based on the palm being in the fixed position or moving. As a specific example, the sensor circuitry indicates the degree of coarseness for the graphics change is a relatively fine cursor movement in response to the palm being in the fixed position. A fine movement may be associated with a smaller area of cursor movement or other graphics movement on a display screen than an area of cursor movement or other graphics movements associated with palm being detected in a position other than fixed, such as a gross movement. As another specific example, the sensor circuitry indicates the degree of coarseness for the graphics change is a gross cursor movement relative to a fine movement based on detection of a pattern of movement of the palm of the user's hand, which indicates the palm is moving. In such an example, the logic circuitry, in response to the touch events, may provide the data associated with the graphics change using a centroid of the pattern of movement of the palm. In other examples, the graphics change may include both a gross movement and a fine movement. For example, the sensor circuitry may indicate a gross cursor movement responsive to changes in the palm position and a fine cursor movement responsive to changes in an average position of a plurality of digits of the user's hand via the touch events. The gross or fine adjustment of or cursor movement may correspond to a gross movement or fine movement as indicated by the data associated with the graphics change, as described above.

In a number of examples, the digit-based touch event may be used to determine fine cursor movement or other actions indicated by the graphics change. For example, the sensor circuitry detects the digit-based touch event by detecting contact of a plurality of digits of the user's hand within a digit contact area of the user interface circuit. Tapping of a digit of the user's hand may be indicative of or otherwise correspond with a right or left click as may occur with a computer mouse. The sensor circuitry detects the tapping and the logic circuitry, in response to the various touch events, provides data associated with the graphics change that corresponds with the right or left (mouse-like) click. As another example, swiping motions of a digit, such as a plurality of the digits, on the digit contact area may be indicative of or otherwise correspond with scrolling of a computer mouse in a horizontal or vertical direction. The sensor circuitry detects the swiping motion, and the logic circuitry, in response, provides the data associated with the graphics changes as corresponding with scrolling in the horizontal or vertical direction, such as scrolling of a cursor or graphics on a display screen.

The sensor circuitry may include a plurality of sensors. For example, the sensory circuitry includes a first sensor and a second sensor and/or a plurality of sensors in an array. The first sensor may detect the palm-based touch event and the second sensor may detect the digit-based touch event. The sensors may be the same or different types of sensors, such as pressure sensors, capacitive sensors, resistive sensors, textile-based sensors, accelerometers, and heat sensors, among other non-limiting examples.

In various examples, the apparatus additionally or alternatively provides haptic feedback in response to the data associated with the graphics change. The sensor circuitry may detect a palm-based touch event caused by a user's hand relative to the user interface surface to indicate a degree of coarseness for a graphics change, and in response, to provide data associated with the graphics change, such as control signals. The logic circuitry may, in response to the palm-based touch event, provide a haptic signal based on the graphics change. The haptic signal may be indicative of feedback to the user related to detected movement of the user's hand. The logic circuitry may provide the haptic signal to another device or to a device associated with the apparatus. The device may include a computing device, such as a personal desktop computer processing unit (CPU) with a display screen, a smartphone, a smartwatch, a smart ring, a keyboard, and the apparatus. In various embodiments, the logic circuitry further provides the data associated with the graphics change, such as a control signal. Similarly to the previously describe examples, the sensor circuitry may include a first sensor to detect the palm-based touch event and a second sensor to detect a digit-based touch event. Such examples can further include, as previously described, the sensor circuitry indicating graphics changes via the touch events that include gross cursor movement responsive to changes in the palm position and fine cursor movement responsive to changes in position of a plurality of digits with respect to the palm.

Other related examples are directed to methods of using the above-described apparatuses and/or to the computing device having the display that responds to the data indicative of the touch event and/or the graphics change, as further described herein.

Turning now to the figures, FIG. 1 illustrates an example apparatus for providing a palm-based graphics change, in accordance with the present disclosure.

The apparatus 100 includes user interface surface 101 and sensor circuitry 102 for detecting touch events 106. The sensor circuitry 102 may be integrated with the user interface surface 101 and together may form a touch sensitive surface. Specific movements of the user's hand, relative to the user interface surface 101, may be detected using the sensor circuitry 102. The apparatus further includes logic circuitry 104 for interpreting the touch events 106. The logic circuitry 104 provides data associated with a graphics change 108, in response to the touch events 106. For example, specific positions of the user's palm and/or patterns of movement of the user's palm, tapping of a digit of the user's palm, and swiping motions of a digit of the user's palm may be differentiated between based on the touch events 106, and used to provide data associated with different graphic changes 108, as further described herein. Such logic circuitry 104 may be implemented in any of various forms including, as examples without limitation, a programmed microcomputer or computer processing unit (CPU), analog and/or binary logic circuits, configurable circuitry such as application-specific integrated circuits (ASICs) and field programmable gate arrays (FPGAs), and combinations of two or more of these forms.

As used herein, the user interface surface 101 includes or refers to a surface, which is in communication with the sensor circuitry 102. The touch sensitive surface includes or refers to the user interface surface 101 and the sensor circuitry 102 that detects user touch on the user interface surface. Although the user interface surface 101 is shown as surrounding the sensor circuitry 102, it may be appreciated that the user interface surface 101 is located above the sensor circuitry 102 such that the user interface surface 101 covers the sensor circuitry 102. However, examples are not so limited and the user interface surface 101 may include or otherwise cover the entire surface of the apparatus 100, part of the surface, and/or may cover the logic circuitry 104.

The sensor circuitry 102 may include a sensor, such as an array of sensors. The sensors may be the same type or different types of sensors. Non-limiting example sensors include but are not limited to pressure sensors, capacitive sensors, resistive sensors, textile-based sensors, accelerometers, and heat sensors. In specific examples, the sensor circuitry 102 may be used to indicate different graphic changes 108 and actions by detecting different types of touch events 106 including palm-based touch events and digit-based touch events via the sensors.

The palm-based touch events are caused by a user's hand relative to the user interface surface 101. For example, a determination of whether or not the user's palm is moving and/or a pattern of the movement may be used to indicate a degree of coarseness for a graphics change 108 related to control of a computer display screen or other visual user interface. In a specific example, the sensor circuitry 102 is to indicate a degree of coarseness for a graphics change by detecting the palm-based touch event. As used herein, the term "graphics change" refers to a change to graphics data (i.e., data usable to render an image) resulting from a user input. The graphics change may include or be related to data that indicates the degree of coarseness for a graphics change as may occur on a display screen in response to a computer mouse input. Examples of such graphics changes include data for a gross or fine cursor movement, gross or fine graphics movement, such as scrolling of the graphics display, or other types of graphics changes. For example, the sensor circuitry 102 may, via the detected palm-based touch event indicative of the degree of coarseness for a graphics change, indicate whether cursor or display scrolling movement is gross or fine based on the palm of the user's hand being in a fixed position or moving. The degree of coarseness may be indicative of whether the graphics change 108 is a fine movement in response to the palm detected as being in the fixed position. Similarly, the degree of coarseness may be indicative of whether the graphics change 108 is a gross movement relative to a fine movement based on detection of a pattern of movement of the palm of the user's hand, which indicates that the palm is moving. As may be appreciated, the fine movement is associated with a smaller area of movement on a display screen relative to a magnitude of movement associated with a gross movement. Accordingly, when the palm is detected as being in the fixed position, the area of cursor movement may be smaller than the cursor movement associated with the palm being in a position other than the fixed position. Examples are not limited to a graphics change that indicates one of fine movement or gross movement, and may include both fine and gross movements corresponding to gross and fine adjustments of a cursor or display. The centroid pattern of the movement, in various such examples, may be used to provide the data associated with the graphics change 108.

The digit-based touch events are caused by a digit of the user's hand relative to the user interface surface 101. The sensor circuitry 102 may detect the digit-based touch event by detecting contact of a digit of the user's hand within a digit contact area of the user interface surface 101. For example, the sensor circuitry 102 may detect contact of a plurality of digits of the user's hand within the digit contact area and detect tapping or swiping of a digit or a subset of the plurality of digits. Digit-based touch events may correspond with right or lefts clocks of a computer mouse and/or scrolling of the graphics in a horizontal or vertical direction. The logic circuitry 104 may, in response to a touch event 106 indicating tapping of the digit, provide data associated with the graphics change 108 corresponding to clicking of a computer mouse. For example, a first digit, such as an index finger, tapping may indicate a left click. A second digit, such as a middle finger, may indicate a right click. In some examples, the above may be different for a left handed user. For example, tapping of the second digit may indicate a left click and tapping of the first digit may indicate a right click. In other examples, the logic circuitry 104 may, in response to a touch event 106 indicating swiping of a digit, provide data associated with the graphics change 108 corresponding to scrolling of the display in a horizontal or vertical direction.

In various examples, the logic circuitry 104 generates a control signal associated with the graphics change 108 including the degree of coarseness of the graphics change 108. In other examples, the logic circuitry 104 provides the data associated with the graphics change 108 to other circuitry to generate the control signal. The other circuitry may include processing circuitry of a computing device having a display screen. The processing circuitry may use the control signal to cause changes in graphics provided on the display screen, such as changes in a cursor position and scrolling of the graphics which are based on the degree of coarseness. For control over the display screen, the apparatus 100 may include a touch pad, a sleeve or cover of a computing device, a keyboard for a computing device, and/or a sleeve or cover for a keyboard of a computing device. In some examples, the logic circuitry 104 and other circuitry are in communication or integrated into a common apparatus, such as the computing device. The computing device may be a tablet, a laptop computer, a computer having a three-dimensional display, a display screen device, and other types of devices.

According to various example, in addition to or alternatively to the above-described examples, the sensor circuitry 102 and logic circuitry 104 generates the data associated with the graphics change 108 responsive to the touch events satisfying a threshold, such as time, movement and/or pressure thresholds. For example, the sensor circuitry 102 detects the palm-based touch event and the digit-based touch event and the logic circuitry 104 compares the detected touch events to the threshold(s). In response to the palm-based touch event and/or digit-based touch event exceeding a time, movement, and/or pressure threshold, the logic circuitry provides the data associated with the graphics change 108. As a specific example, in response to the touch events indicating the palm and/or a digit of the user are in a stationary or fixed position for greater than or equal to a threshold period of time, the logic circuitry 104 generates the data associated with the graphics change 108. In other examples and/or in addition, in response to the touch events indicating the palm and/or the digital of the user meet or exceed a pressure threshold, the logic circuitry 104 generates the data associated with the graphics change 108.

In a number of examples, a plurality of thresholds may be used and in which graphics change 108 and/or the control signal is provided in response to the touch events satisfying the plurality of thresholds. For example, a plurality of time, movement and/or pressure thresholds may be used that are related to the palm-based touch event and the digit-based touch event. As a specific example, the data associated with the graphics change 108 is provided based on the palm-based touch event being above or below a first movement threshold for greater than or equal to a time threshold, and the digit-based touch event being above or below a second movement threshold. Other examples may include both movement and pressure thresholds. Example movement thresholds may include amounts of change in position of the palm or a digit. In such examples, the sensor circuitry 102 senses the user's palm and/or digit, which is used to convey the data associated with the graphics change 108, by sensing that the palm is in a fixed position for a minimum time threshold and/or pressure caused by the digit and/or the palm exceeds a pressure threshold.

Various combinations of thresholds may be used by the logic circuitry 104, with concurrent detection of palm-based and digit-based touch events for providing the data associated with the graphics change 108. In such various examples, in combination with one or multiple thresholds used by the sensor circuitry 102 and logic circuitry 104 for sensing the user's palm is relatively stationary or fixed for a threshold period of time, concurrent instances of the palm-based and digit-based touch events may be detected for providing the data associated with the graphics change 108.

The apparatus 100, in accordance with some examples, may be used to provide haptic feedback. In such examples, the logic circuitry 104, or other processing circuitry/logic circuitry, provides a haptic signal based on the graphics change 108. The haptic signal is indicative of feedback to the user related to detected movement of the user's hand and use of the apparatus 100 to replace, or in some instances be used with, another display-control tool such as a computer mouse. The haptic signal may be provided by the logic circuitry 104 of the apparatus 100 and/or circuitry of the computing device having the display screen. Additionally and/or alternatively, the haptic signal may be provided, from the apparatus 100 or the circuitry of the computing device, to another device. The device may include the computing device, a smartphone, a smartwatch, a smart ring or glasses, a keyboard or the apparatus 100 itself. The haptic signal may be used to generate haptic feedback provided to the user. For example, an audio sound is provided, similar to a mouse clicking, or a vibration is provided through the user interface surface 101 and/or via another computing device processing the haptic signal.

Figure 2:
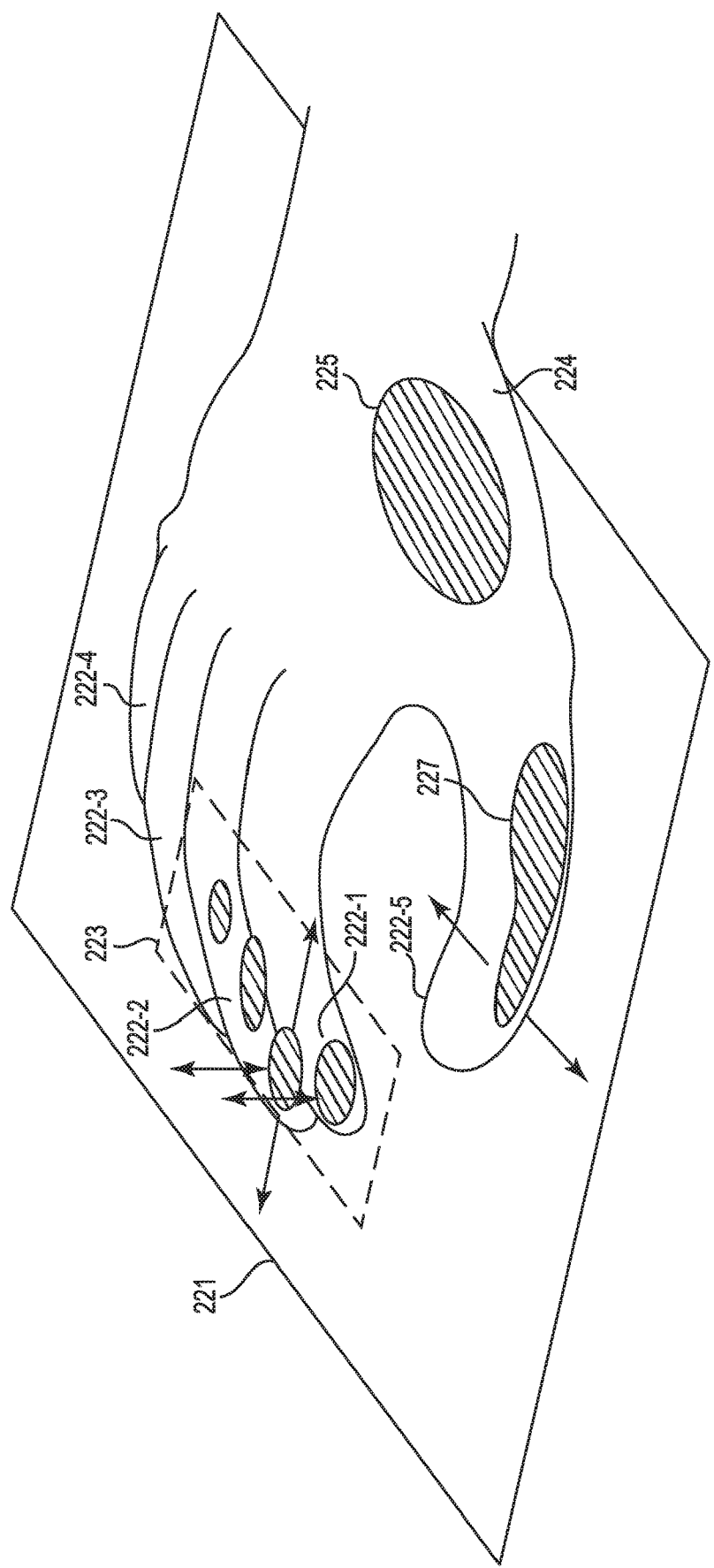
FIG. 2 illustrates example touch events caused by a user's hand relative to an apparatus, in accordance with the present disclosure.

FIG. 2 illustrates example touch events caused by a user's hand relative to an apparatus, in accordance with the present disclosure. The apparatus, similarly to the apparatus 100 of FIG. 1, includes a user interface surface and associated sensor circuitry which provide a touch-sensitive surface 221.

The touch-sensitive surface 221 may be used to detect different touch events and to recognize contact patterns associated with the position of the user's hand relative to the user interface surface. The contact pattern may be associated with a cupped hand being placed on the surface. The different touch events include digit-based touch events and palm-based touch events. The contact pattern of the digits 222-1, 222-2, 222-3, 222-4, 222-5, herein generally referred to as "the digits 222" for ease of reference, and the palm 224 may be used to provide the graphics changes corresponding to gross cursor movement, fine cursor movement, left and right clicks of a computer mouse, and swiping of a computer mouse. As described above, the touch events may be indicative of a degree of coarseness for the graphics change.

The sensor circuitry may be used to detect a contact pattern and a pattern of movement of the user's palm 224. The contact pattern may be associated with contact of the digits 222 of the user's hand within the digit contact area 223 of the touch-sensitive surface 221 and/or contact of the palm 224 of the user interface surface within the palm contact area 225 of the touch-sensitive surface 221. In some examples, the plurality of digits 222 contacting the digit contact area 223 provide a digit-based touch event, and a palm 224 of the user contacting and being fixed on the palm contact area 225 provides a palm-based touch event, which may activate the graphics-control device, as further described herein. The activation may be responsive to a contact pattern of the user's hand including both the palm 224 and the digits 222 mimicking a hand pose used to hold a computer mouse.

The sensor circuitry may detect a pattern of movement of the user's hand as another palm-based touch event. The pattern of movement may indicate that the palm 224 is in a fixed position or is moving. In some examples, the pattern of movement may indicate that the palm 224 is moving, albeit, with a centroid of the pattern of movement that is below a threshold, such that the palm 224 is minimally moving. The logic circuitry of the apparatus, in response, provides data associated with the graphics change using the centroid of the pattern of movement. For example, the sensor circuitry indicates the cursor movement associated with the touch event is a fine movement in response to the detected pattern of movement indicating the palm 224 is fixed or is otherwise below a threshold of movement, such as the centroid of the pattern being below the movement threshold. The sensor circuitry indicates the cursor movement is a gross movement relative to the fine movement in response to the detected pattern of movement indicating the palm 224 is moving or otherwise above the movement threshold.

Examples are not limited to binary gross and fine movements. In various examples, the graphics change corresponds with both gross and fine movements. For example, the gross and fine movements may be indicative of a gross cursor movement or other display changes responsive to changes in the palm position and of a fine movement responsive to changes in the average position of the plurality of digits 222 with respect to the palm 224 via the touch events. In such examples, the logic circuitry may provide the data associated with the graphics change that is indicative of both gross and fine movements of a cursor and/or graphics. The gross movement may be responsive to changes in the palm position and the fine movement may be responsive to the changed position of the digits 222 of the user.

The sensor circuitry may detect additional or alternative digit-based touch events based on contact of the digits 222 within the digit contact area 223. Graphic changes corresponding with left and right mouse-like click inputs may be generated responsive to tapping or additional pressure on the digit contact area 223 of the index finger 222-1 and middle finger 222-2. A middle button click and/or scroll may be generated responsive to tapping or additional pressure on the digit contact area 223 with the index finger 222-1 and middle finger 222-2 occurring concurrently. Scrolling of a display screen or the cursor may be generated responsive to swiping motions associated with the digits 222, such as the thumb 222-5 within the thumb contact area 227 of touch-sensitive surface 221 and/or the index finger 222-1 within the digit contact area 223.

The above provides non-limiting examples of different digits and/or movement or actions of digits and corresponding cursor or display screen guidance and control, and examples in accordance with the present disclosure are not limited to those described above examples of graphics changes. As may be appreciated, a user that is left-handed may use different digits to provide associated graphics changes than a right-handed user uses. For example, for a left-handed user, tapping of the middle finger 222-2 may indicate a left mouse-like click input and tapping of the index finger 222-1 may indicate a right mouse-like click input. For a right-handed user, tapping of the middle finger 222-2 may indicate a right mouse-like click input and tapping of the index finger may indicate a left mouse-like click input. Additionally, a user may adjust which fingers provide graphics changes based on preference. The user may provide an input to the logic circuitry or to the computing device having the display that indicates if the user is right or left handed and/or selection of a particular digit or digits touch events. In such examples, the user may specify which digits and particular motions or actions that cause different graphics changes.

In accordance with a number of examples, the logic circuitry differentiates between digit-based touch events and palm-based touch events. As illustrated by FIG. 2, the logic circuitry may be programmed to detect different touch events at different areas of the touch-sensitive surface 221, such as the illustrated palm contact area 225, the digit contact area 223, and the thumb contact area 227, as digit-based touch events and palm-based touch events. The palm contact area 225, the digit contact area 223, and/or the thumb contact area 227 may include predefined areas of the touch-sensitive surface 221, which may be marked for the user. Although examples are not so limited and the touch-sensitive surface 221 may distinguish between a palm-based touch event and a digit-based touch event based on a relative sensing area of the surface 221. For example, the palm contact area 225 may be larger than the digit contact area 223, or vice versa. In other examples and/or in addition, the touch-sensitive surface 221 and logic circuitry distinguishes a palm-based touch event from a digit-based touch event based on the number of contact points, with a palm-based touch event having one contact point and the digit-based touch event having a plurality of contact points of smaller size than the palm-based touch event. In further examples and/or in addition, the touch-sensitive surface 221 distinguishes between the palm-based touch event and the digit-based touch event based on a relative location of contact on the touch-sensitive surface 221 and/or anatomy of a human hand. As a particular example, the palm-based touch event may include a contact that is lower or beneath a contact indicative of a digit-based touch event. As may be appreciated, lower or beneath is relative, and the palm-based touch event may include a contact that is higher or above a contact indicative of a digit-based touch event.

Examples in accordance with the present disclosure are not limited to the above listed graphics changes and/or corresponding cursor or display guidance and control. Other graphics changes and related display guidance or control examples include zooming in or zooming out the display view, selecting or hiding windows, full screen or split screen display, and changes in screen settings, such as display ratio, resolution, orientation, contrast, and brightness, among other display controls. Additionally, various examples include control other than graphics changes, such as volume-control inputs.

As previously described, various examples may include haptic feedback provided using a haptic signal. The feedback may be an audio clicking sound or haptic vibration in response to or based on the graphics change, which may correspond to a mouse-like click or other input, as previously described.

Figure 3:
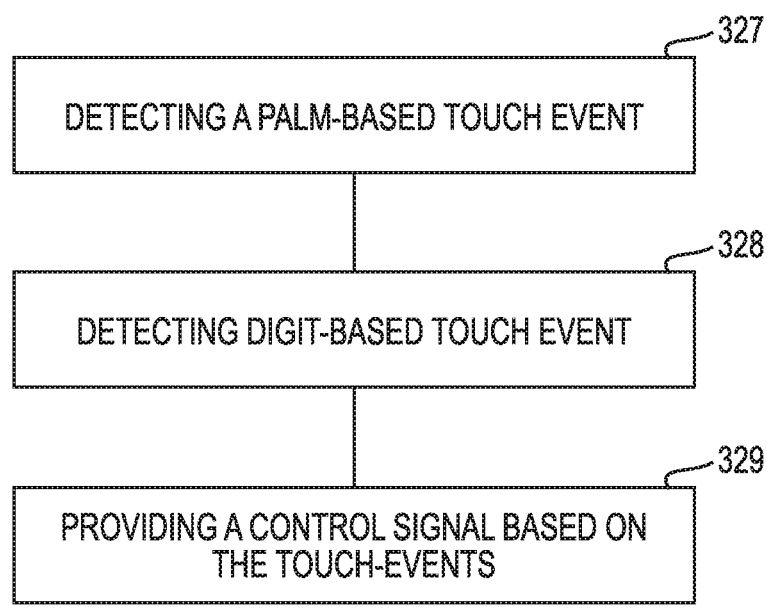
FIG. 3 illustrates an example method for providing palm-based graphics change, in accordance with the present disclosure.

FIG. 3 illustrates an example method for providing graphics changes in accordance with the present disclosure. The method includes use of one or more of the above-described apparatuses, such as the apparatus 100 illustrated by FIG. 1.

The method includes, at 327, detecting, by sensor circuitry that is integrated with a user interface of an apparatus, a palm-based touch event caused by a user's hand relative to the user interface surface of the apparatus. As described above, the palm-based touch event may be indicative of a degree of coarseness for a graphics change. The graphics change may include a gross or fine movement or change based on the palm being in a fixed position or moving. At 328, the method includes detecting, by the sensor circuitry, a digit-based touch event caused by a plurality of digits of the user's hand relative to the user interface surface. The detection of the palm-based and digit-based touch events may be concurrent, in various examples. And, at 329, the method includes providing a control signal indicative of the graphics change to a computing device having a display screen in response to the touch events satisfying a threshold. In specific examples, the control signal is provided in response to the touch events satisfying a plurality of thresholds. As an example, the threshold includes a time threshold for which movement of palm is below a movement threshold that indicates the palm is in a fixed position. In various examples, as further illustrated herein, a haptic signal is provided to another computer device, in response to the graphics change.

In a number of specific examples, the sensor circuitry is integrated with the user interface surface to detect concurrent instances of the palm-based touch event and the digit-based touch event caused by the user's hand relative to the user interface surface. In response to the palm-based touch event and the digit-based touch event satisfying a plurality of thresholds, a control signal indicative of the graphics change is provided, such as to the computing device having the display screen. The thresholds may include movement thresholds, time thresholds and/or pressure thresholds. An example movement threshold includes a minimum time for which there is no movement or movement below a threshold of the palm and/or the plurality of digits of the user. In a specific example, the above-described threshold(s) activates use of the apparatus for providing graphics changes and control. For example, after activation, additional movement is detected and used to change graphics of the computing device. In such an example, additional touch events may cause the change in the graphics, and which may additionally be based on or responsive to an additional threshold. In response to activation and/or the control signal being provided to the computing device, a haptic signal may be provided to another computer device, as described above. The haptic signal may be provided to the user to confirm activation of the apparatus for providing graphics changes.

Figure 4:
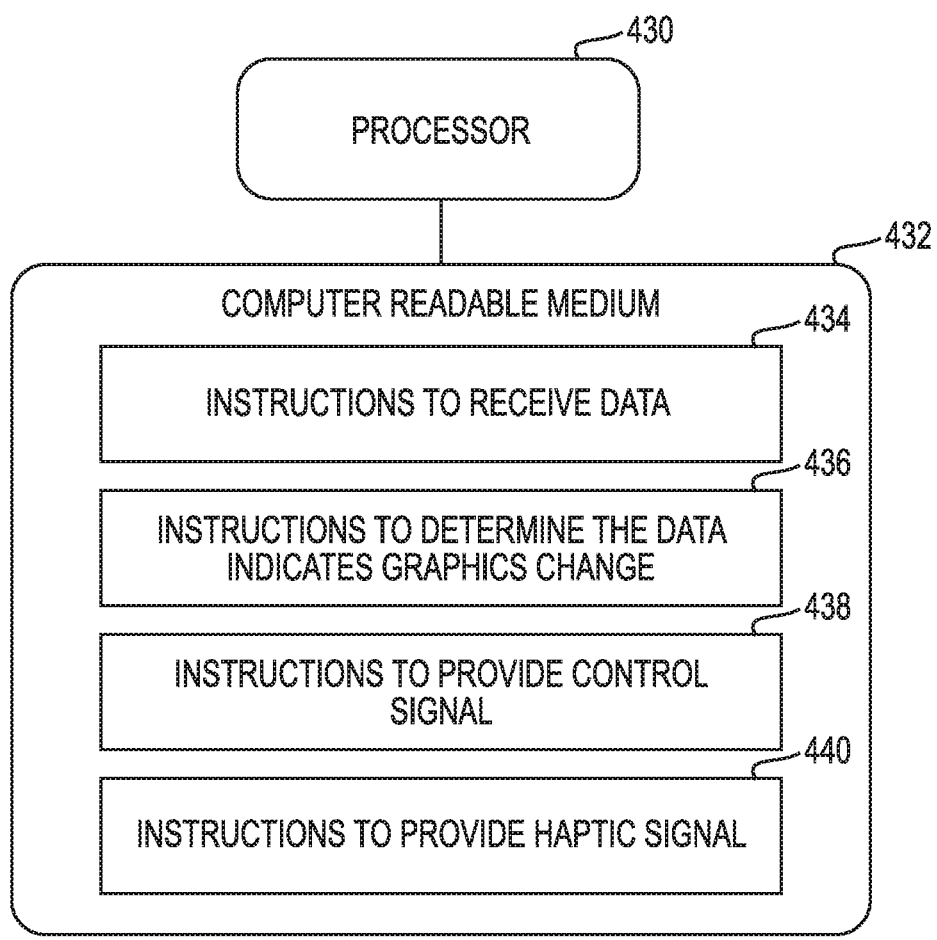
FIG. 4 illustrates an example computing device including non-transitory computer-readable medium storing executable code, in accordance with the present disclosure.

FIG. 4 illustrates an example computing device including non-transitory computer-readable medium storing executable code, in accordance with the present disclosure. The computing device, in accordance with examples herein, includes the device having a display screen that is controlled by the data associated with the graphics changes, such as the display screen on a laptop computer, a tablet or other computing device.

The computing device has a processor 430 and computer readable medium 432 storing a set of instructions 434, 436, 438, 440. The computer readable medium 432 may, for example, include read-only memory (ROM), random-access memory (RAM), electrically erasable programmable read-only memory (EEPROM), Flash memory, a solid state drive, and/or discrete data register sets. At 434, data may be received that is indicative of the graphics change. The apparatus may be in communication with the computing device, in a wired or wireless manner. At 436, it may be determined whether the data indicates the degree of coarseness for a graphics change and/or a graphics change, and at 438, in response to the data indicating the graphics change, a control signal may be provided. The control signal, as previously described, may be based on detected movement of the user's hand with reference to a user interface surface of an apparatus and is indicative of a degree of coarseness for the graphics change. The control signal may cause a change in the graphics. Example graphics changes may include movement of a cursor, scrolling of the graphics, selection of an icon on the display screen, etc., as well as the degree of coarseness for the graphics change. At 440, a haptic signal may be provided based on the graphics change. The processor 430 may carry out the operations stored on the computer readable medium, including those operations characterized by way of instructions 434, 436, 438, 440, and as may include other operations or activities as characterized herein.

Figure 5:
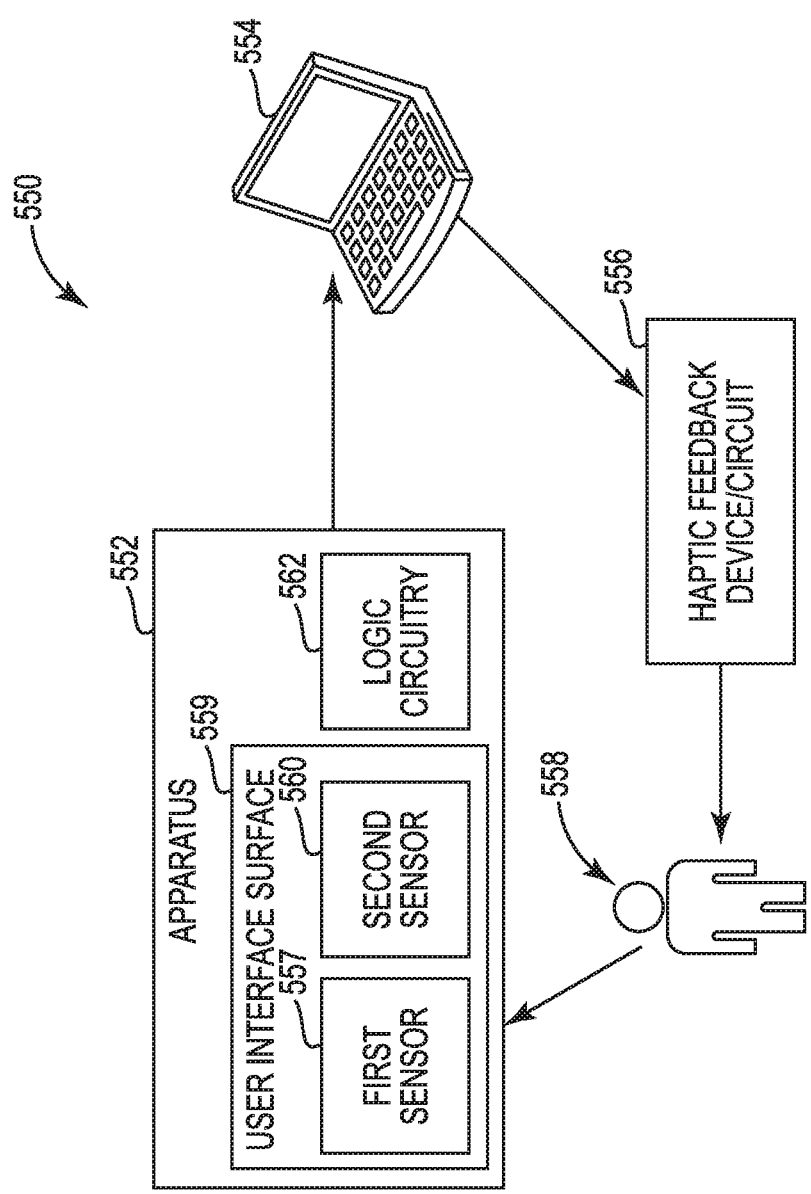
FIG. 5 illustrates an example system for providing palm-based graphics change, in accordance with the present disclosure.

FIG. 5 illustrates an example system for providing palm-based graphics change, in accordance with the present disclosure. The system 550 includes an apparatus 552, such as the apparatus 100 illustrated by FIG. 1, a computing device 554, and a haptic feedback device 556.

The apparatus 552 may include sensor circuitry, such as a first sensor 557 and a second sensor 560, a user interface surface 559, and logic circuitry 562. Although the apparatus 552 is illustrated as having first and second sensors 557, 560, the sensor circuitry may include an array of sensors or each of the first and second sensors 557, 560 may include an array of sensors. The sensor circuitry detects the palm-based touch event and the digit-based touch event. For example, the first sensor 557 may detect the palm-based touch event caused by a hand of the user 558 relative to the user interface surface 559 and which is indicative a degree of coarseness for a graphics change. The second sensor 560 may detect the digit-based touch event caused by a digit of the hand of the user 558 relative to the user interface surface 559. The logic circuitry 562 may respond to the touch events, and provide data associated with the graphics change. The data may be a control signal associated with or that otherwise causes the graphics change, such as cursor-guidance or other graphics-control. The apparatus 552 may be in communication with or form part of the computing device 554.

In more specific examples, the logic circuitry 562 and the user interface surface 559 may be integrated to sense touch events using different types of known touch-sensing circuitry as generally depicted in FIG. 5. As examples, for sensing physical-pressure touches and near-touch proximity events, the sensing circuitry may include one or a combination of the following types of sensors. A first type is a capacitive-based grid-array sensor with the surface 559 being coated with a material that stores electrical charges. When a touch event occurs at an area of the surface 559, a small amount of charge is drawn to the point of contact or near contact. Circuits located in the logic circuitry 562 measure the (change in) charge and send the information to the controller for processing. As a second type, the integrated circuitry may be alternatively or additionally sense surface wave changes by using ultrasonic waves that pass over the surface 559. When a touch event occurs, a portion of the wave is absorbed. This change in the ultrasonic waves registers the position of the touch event and data indicative of this position is sent as the graphics change. As another type, the integrated logic circuitry 562 and user interface surface 559 may be alternatively or additionally sense a change in the electrical current flowing in the surface 559 with the surface 559 being coated with a thin metallic electrically conductive and resistive layer that causes the electrical current change which is registered as a touch event.

Yet another approach, such as for detecting the palm pressure, involves an accelerometer to measuring pressure of the user's palm relative to a minimum-pressure threshold. The accelerometer includes both pressure-caused movement and capacitive sense technology, as described above. The minimum pressure threshold may be used alone or together with a minimum time threshold to assure that the palm is being held with such minimum pressure for a minimum time or time range. The accelerometer senses the touch event by an accelerative force moving, by pressure, a flexible structure beneath or at the surface 559. This movement also causes the capacitance to change. As with the capacitive-based grid-array sensor, the logic circuitry 562 includes circuitry implemented as an accelerometer with circuitry to convert from capacitance to voltage.

As a specific example, a variable capacitive micro-electro-mechanical system (MEMS) direct-current (DC) accelerometers may be used as the first sensor 557 that detects the palm-based touch event. In this context, the first sensor 557 includes a micro-machined proof mass with flexures suspended between two parallel plates. The parallel plates may be contained inside display control device, such as the apparatus 552 of FIG. 5. In response to pressure from a user's palm, the flexures, and two air gap capacitors between the proof mass and upper and lower plates, one air gap decreases and the other air gap increases, creating a change in capacitance proportional to the acceleration which characterizes the pressure from the palm as a voltage level.

The computing device 554 may be a laptop computer, a tablet, or other computing device having a display screen to provide a display. The apparatus 552 communicates with the computing device 554 to provide control over the display screen, thereby operating to replace a computer mouse. The control signal, which may be provided by the apparatus 552 or generated by the computing device 554 using the data provided by the apparatus 552, causes the change in the graphics such as cursor actions, scrolling or other movement. In a number of specific examples, the computing device 554 provides haptic feedback to the user 558 based on the graphics change, such as by the computing device 554 generating a haptic signal. The haptic signal may cause a device to output an audio sound wave or generate vibrations. The haptic signal is provided to a haptic feedback device 556, which may be the computing device 554 or a component thereof, such as speakers or a keyboard, or another device. For example, the haptic feedback device 556 may be a smartphone, a smartwatch, a smart ring, smart glasses, or the apparatus 552. As a specific example, a smartphone, a smartwatch, a smart ring, smart glasses, or the apparatus 552 may provide a vibration or audio sound as the haptic feedback, such a clicking sound in response to the graphics change provided by the apparatus 552 which may be related to a clicking of a computer mouse.

Terms to exemplify orientation, such as upper/lower, left/right, top/bottom and above/below, may be used herein to refer to relative positions of elements as shown in the figures. It should be understood that the terminology is used for notational convenience and that in actual use the disclosed structures may be oriented different from the orientation shown in the figures. Thus, the terms should not be construed in a limiting manner.

Various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, circuit and/or other circuit-type depictions. For instance, reference numerals 102 and 104 of FIG. 1 depict a block/module as described herein. Such circuits or circuitry are used together with other elements to exemplify how certain examples may be carried out in the form or structures, functions, operations, activities, etc. In certain of the above-discussed examples, modules are discrete logic circuits or programmable logic circuits for implementing these operations/activities, as may be carried out in the approaches shown in FIG. 3. In certain examples, such a programmable circuit may include memory circuitry for storing and accessing a program to be executed as a set (or sets) of instructions. Additionally and/or alternatively, the program may be used as configuration data to define how the programmable circuit is to perform, and an algorithm or process with respect to FIG. 4 is used by the programmable circuit to perform the related, functions, operations, activities, etc. Depending on the application, the instructions, configuration data, and/or process may be implemented in logic circuitry, with the instructions, whether characterized in the form of object code, firmware or software) stored in and accessible from a memory (circuit).

Based upon the above discussion and illustrations, the various modifications and changes may be made to the various examples without strictly following the examples and applications illustrated and described herein. For example, methods as depicted in the Figures may involve steps carried out in various orders, with various aspects of the examples herein retained, or may involve fewer or more steps. For instance, the computing device 554 illustrated by FIG. 5 may include the processor 430 and computer readable medium 432 illustrated by FIG. 4. As another example, the apparatus 100 illustrated by FIG. 1 or the system 550 illustrated by FIG. 5 may implement the process illustrated by FIG. 3. Such modifications do not depart from the true spirit and scope of various aspects of the disclosure, including aspects set forth in the claims.

What is claimed is:

1. An apparatus comprising:
a user interface surface;
sensor circuitry to:
   detect a palm-based touch event caused by a palm of a user's hand relative to the user interface surface to indicate a degree of coarseness for a graphics change; and
   detect, concurrently with the detection of the palm-based touch event, a digit-based touch event caused by a digit of the user's hand relative to the user interface surface; and logic circuitry to differentiate between touch events caused by the palm and touch events caused by the digit and, in response to the palm-based touch events indicating the palm is in a fixed position and the digit-based touch event indicating a position of the digit, provide data associated with the graphics change.

2. The apparatus of claim 1, wherein the degree of coarseness is indicative of whether the graphics change is a relatively gross or fine cursor movement based on whether the palm is detected as being in the fixed position, and the apparatus is to, in response to the touch events, operate to replace a computer mouse and provide control over computer-screen graphics.

3. The apparatus of claim 1, wherein the degree of coarseness is indicative of whether the graphics change is a fine cursor movement in response to the palm detected as being in the fixed position, wherein the fine cursor movement is associated with a smaller area of cursor movement on a display screen relative to an area of cursor movement associated with the palm detected as being in a position other than the fixed position.

4. The apparatus of claim 1, wherein:
the degree of coarseness is indicative of whether the graphics change is a gross movement relative to a fine movement based on detection of a pattern of movement of the palm of the user's hand; and
the logic circuitry is to, in response to the touch events, provide the data using a centroid of the pattern of movement of the palm.

5. The apparatus of claim 1, wherein:
the sensor circuitry is to detect the digit-based touch event by detection of contact of a plurality of digits of the user's hand within a digit contact area of the user interface surface and detection of tapping of the digit among the plurality of digits; and
the digit-based touch event corresponds with a right or left click of a computer mouse.

6. The apparatus of claim 1, wherein:
the sensor circuitry is to detect the digit-based touch event by detection of swiping motions of the digit of the user's hand; and
the logic circuitry is to, in response to the touch events, provide the data associated with the graphics change as corresponding with scrolling of the graphics in a horizontal or vertical direction.

7. The apparatus of claim 1, wherein:
the logic circuitry is to generate a haptic signal in response to the data associated with the graphics change; and
the apparatus is a device from among the group: a touch pad, a touch screen, a sleeve to be placed over or around a keyboard, a cover for a computing device, and a cover for a keyboard of a computing device.

8. The apparatus of claim 1, wherein the sensor circuitry includes a first sensor to detect the palm-based touch event and a second sensor to detect the digit-based touch event, and the first and second sensors include different types of sensors from among the group: pressure sensors, capacitive sensors, resistive sensors, textile-based sensors, accelerometers, heat sensors, and combinations thereof.

9. The apparatus of claim 1, wherein the sensor circuitry includes a first sensor to detect the palm-based touch event and a second sensor to detect the digit-based touch event, and the first and second sensors include the same type of sensors from among the group: pressure sensors, capacitive sensors, resistive sensors, textile-based sensors, accelerometers, and heat sensors.

10. A apparatus comprising:

a user interface surface;

sensor circuitry to detect a palm-based touch event caused by a palm of a user's hand relative to the user interface surface to indicate a degree of coarseness for a graphics change, and in response, to provide data associated with the graphics change; and logic circuitry to differentiate between the palm-based touch event and a digit-based touch event caused by a digit of the user's hand relative to the user interface surface and, in response to the palm-based touch event, provide a haptic signal based on the graphics change.

11. The apparatus of claim 10, wherein the haptic signal is indicative of feedback for the user related to detected movement of the user's hand.

12. The apparatus of claim 10, wherein:

the logic circuitry is to provide the haptic signal to a device from among the group: a computing device, a smartphone, a smartwatch, a smart ring, a keyboard, and the apparatus; and the sensor circuitry is to indicate the graphics change via the touch events, the graphics change including:

a gross cursor movement responsive to changes in the palm position; and a fine cursor movement responsive to changes in position of a plurality of digits with respect to the palm.

13. The apparatus of claim 10, wherein:

the sensor circuitry includes:

a first sensor to detect the palm-based touch event; and a second sensor to detect a digit-based touch event indicative of a position of a digit of the user's hand; and the logic circuitry to, in response to the touch events, provide the data associated with the graphics change as being a gross or fine movement based on whether the palm of the user is in a fixed position or moving.

14. A method comprising:

detecting, concurrently by sensor circuitry that is integrated with a user interface surface of an apparatus:

a palm-based touch event caused by a palm of a user's hand relative to the user interface surface to indicate a degree of coarseness for a graphics change; and a digit-based touch event caused by a plurality of digits of the user's hand relative to the user interface surface;

differentiating between touch events caused by the palm and touch events caused by the plurality of digits; and in response to the palm-based touch event and the digit-based touch events satisfying a threshold, providing a control signal indicative of the graphics change to a computing device having a display screen.

15. The method of claim 14, wherein the graphics change is a gross or fine change based on the palm being in a fixed position or moving, the threshold includes a time threshold for which movement of the palm is below a movement threshold indicating the palm is in the fixed position, and the method further including providing, to another computing device, a haptic signal in response to the graphics change.

* * * * *